UNITED STATES PATENT OFFICE.

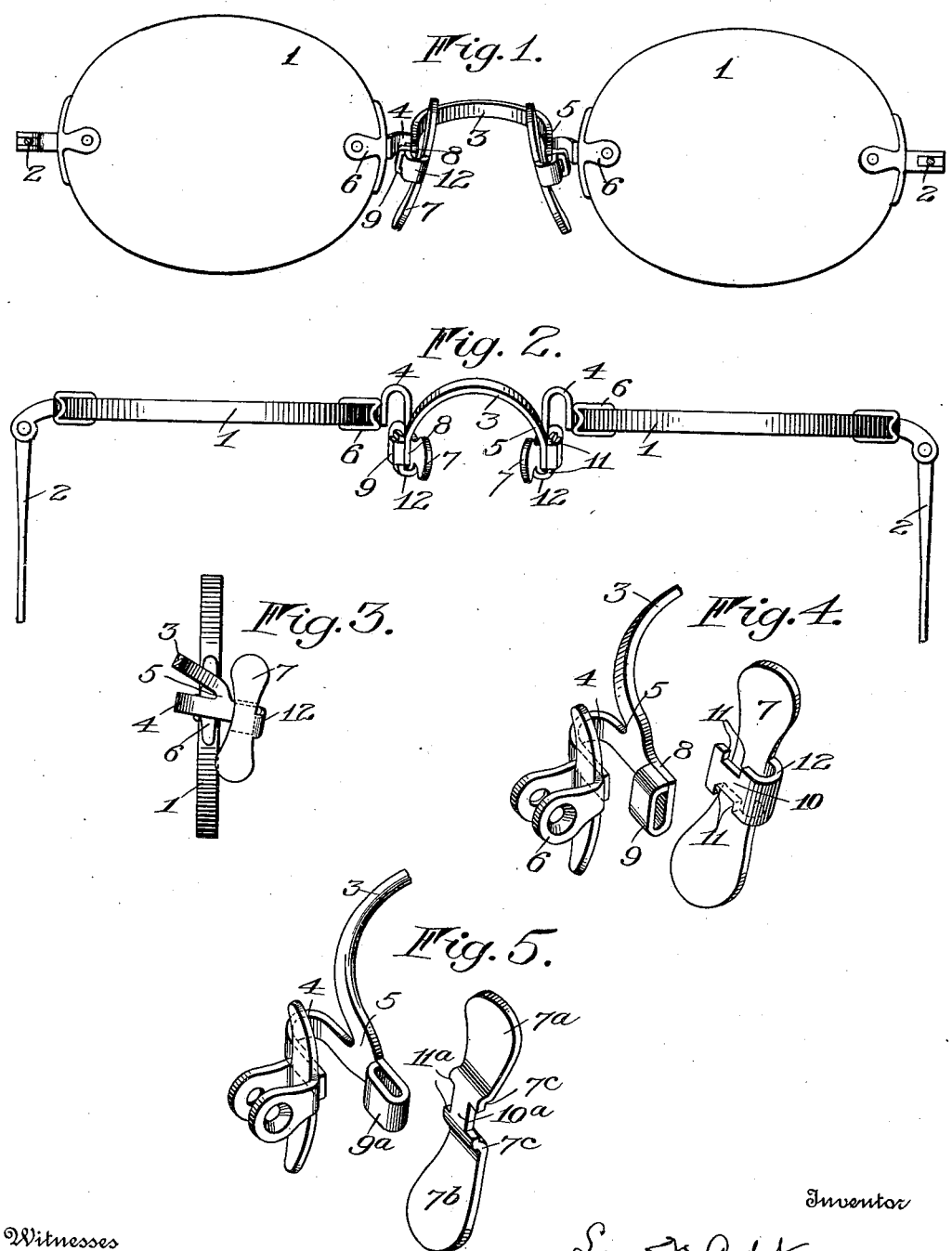

LEO F. ADT, OF ALBANY, NEW YORK.

MOUNTING FOR SPECTACLES.

1,098,366. Specification of Letters Patent. Patented June 2, 1914.

Application filed May 13, 1910. Serial No. 561,168.

*To all whom it may concern:*

Be it known that I, LEO F. ADT, of Albany, in the county of Albany and State of New York, have invented certain new and useful Improvements in Mountings for Spectacles; and I do hereby declare the following to be a full, clear, and exact description of the same, reference being had to the accompanying drawings, forming a part of this specification, and to the reference-numerals marked thereon.

The present invention relates to mountings for spectacles of the type in which nose rests are provided for removing the weight of the spectacles from the fleshy portion of the nose lying between the eyes, and it has for an object to provide a construction in which the nose rests are so located that they will not be engaged when the lens attaching devices are adjusted for short pupillary distances.

Another object of the invention is to provide for mounting the nose rests so that they may conform to the forward and the upward taper of the nose, while at the same time will be inconspicuous when the mounting is viewed from the front.

To these and other ends the invention consists in certain improvements and combinations of parts all as will be hereinafter more fully described, the novel features being pointed out in the claims at the end of the specification.

In the drawings: Figure 1 is a rear view of a spectacle mounting embodying the present improvements; Fig. 2 is a top view of the same construction; Fig. 3 is a central vertical section through the mounting; Fig. 4 is a detail perspective view of the same construction showing the nose rest and the mounting separated, and Fig. 5 is a like view of another embodiment of the invention.

Referring more particularly to the drawings 1 indicates the lenses and 2 the temples connected to the outer edges thereof. The inner edges of the lenses are connected by a mounting comprising in this instance a bridging portion 3 inclined forwardly to the plane of the lenses to conform to the nose of the wearer and connected at its ends by pliable portions 4. These pliable portions are in this instance in the form of substantially horizontally arranged and rearwardly opening loops having their inner ends connected to the extremities of the bridging portion and forming with the latter forwardly opening and vertically arranged loops 5. The inner arms of the rearwardly opening loops lie directly beneath and project forwardly from the extremities of the bridging portion while the outer arms of said loops connect with the lens attaching devices 6 which in this instance are secured to the inner edges of the lenses 1. This arrangement permits the extremities of the bridging portion to lie substantially in the plane of the lenses, while at the same time adjustment for pupillary distances and for the forward and the rearward set of the lenses is provided.

In order to prevent the spectacles from being supported entirely by the bridging portion 3, the embodiment shown in Figs. 1 to 4 is provided with rests 7 having, in this instance, continuous nose bearing surfaces. These are preferably located in rear of the extremities of the bridging portion and are supported by the mounting at points between the pliable portions 4 so that the lens attaching devices may be adjusted relatively to each other without affecting the relative positions of the nose rests. In the present instance arms 8 are extended rearwardly and downwardly from the junction of the pliable portion 4 and the bridging portion 3, and are provided with flattened sockets or sleeve bearings 9, the axes of said sleeves extending horizontally and transverse to the plane of the lenses. Received within each of these bearings is a flattened bearing portion 10 carried by one of the nose rests 7 and provided at opposite ends with shoulders 11 for coöperation with the ends of the sleeve. The smaller transverse diameter of the sleeve bearing is greater than the smaller transverse diameter of the flattened bearing portion 10 so that there is permitted a rocking of the nose rest about an axis extending in the direction of the longitudinal axis of the sleeve to conform to the forward taper of the nose and also a rocking of the nose rest about an axis extending in the direction of the larger transverse axis of the sleeve, in order that the nose rest may conform to the forward taper of the nose. The bearing portion 10 is preferably arranged on the outer side of its nose rest and is connected to the latter by a loop or bend 12 which permits the nose rest to lie on the inner side of the arm 8 and at the same time to be faced to conform more nearly correctly to the shape of the nose, the facing being effected by bending the metal in the loop 12. It is apparent that the axes about which each nose rest turns are located in one instance between the upper and lower edges of the nose rest and in the other instance between the front and rear of the nose rest so that ease of action in the rest is obtained. The horizontal axis about which the guard turns is located below the extremities of the bridging portion so that it is possible to engage the nose firmly on the bony part.

The embodiment of the invention shown in Fig. 5 is substantially the same as that shown in the first named figures. It differs however, in that each bearing sleeve 9ª has its axis vertically arranged and the coöperating flattened bearing 10ª is interposed between and connects the nose engaging surfaces 7ª and 7ᵇ of the nose rest, the said surfaces being offset inwardly at 7ᶜ in order that they may lie in a plane of the inner face of the bridging portion. In this embodiment also the nose rest turns about an axis extending longitudinally of the sleeve 9ª and also about an axis extending in the direction of the greatest width of said sleeve, the shoulders 11ª preventing the sliding movement of the nose rest within the sleeve and at the same time holding said nose rest in an upright position. The connection between the nose rest and the mounting is so arranged that it is invisible from the front as the loop 9ª and the flat bearing portion 10ª are located in a horizontal plane with and in rear of the pliable portion 4.

The spectacles are applied in the same manner as ordinary spectacles, and the nose rests engage the nose in a manner to remove the weight of the spectacles from the fleshy part between the eyes of the wearer. The rests automatically adapt themselves to the tapers of the nose and the latter is engaged below the extremities of the bridging portion on the bony part, the connections between the rests and the mounting being so located that they are inconspicuous.

I claim as my invention:

1. In a spectacle, the combination with lenses, temples, lens attaching portions and a non-resilient, forwardly inclined bridging portion having rearwardly proceeding ends, of portions connecting the said bridge ends with the respective lens attaching portions, each embodying an arm proceeding forwardly from the bridge end, rearwardly extending arms proceeding from the junctions of the connecting arms and the bridge ends and nose rests mounted on the free ends of said arms in fixed spaced relation.

2. In a spectacle, the combination with lenses, temples, lens attaching portions and a non-resilient forwardly inclined bridging portion having rearwardly proceeding ends, of a connecting portion joining each end of the bridge and the adjacent lens attaching portion embodying a forwardly proceeding arm connected to such end, of nose rests and supporting arms therefor each extending rearwardly from the junction of a bridge end and a connecting arm and having a free end extending across the inner side of a nose rest and to which the latter is secured.

3. In a spectacle mounting, the combination with lenses and temples connected thereto, a rigid bridging portion inclined to the plane of the lenses, a lens attaching device, and a pliable portion between the bridging portion and the lens attaching device embodying an arm extending forwardly from and directly beneath an extremity of the bridging portion and forming a forwardly opening and vertically arranged loop, of a nose rest connected to the mounting at the junction of the arm and the bridging portion.

4. In a spectacle mounting, the combination with lenses and temples connected thereto, a rigid bridging portion, lens attaching devices and pliable portions comprising rearwardly opening loops having outer arms connected to the lens attaching devices and inner arms connected to and lying directly beneath the extremities of the bridging portion to form therewith vertical forwardly opening loops, of nose rests having fixed spaced relation connected to the mounting at the junction of the bridge extremities and the inner arms of the rearwardly opening loops.

5. In a spectacle mounting, the combination with lenses and temples connected thereto, a rigid bridging portion inclined to the plane of the lenses, a lens attaching device, and a pliable portion embodying an arm extending forwardly from one of the extremities of the bridging portion and providing a forwardly opening loop, of a nose rest supporting member extending rearwardly from the loop in alinement with the arm, and a nose rest carried by said member.

6. In a spectacle mounting, the combination with lenses and temples connected thereto, a rigid bridging portion inclined to the plane of the lenses, lens attaching devices and pliable portions connecting the latter with the bridging portion and embodying forwardly extending arms forming forwardly opening loops with the said bridging portion, of nose rests, and means having fixed spaced relation connecting the nose rests with the mounting at points both of which lie between the two pliable portions and supporting said nose rests in rear of the extremities of the bridging portion, the said connecting means having provision permitting the rocking of the nose rests at points substantially midway between the upper and the lower edges of the nose engaging surfaces and just in rear of the ends of the bridge.

7. In a spectacle mounting, the combination with lenses and temples connected thereto, a rigid bridging portion inclined to the plane of the lenses, lens attaching devices and pliable portions between the lens attaching devices and the bridging portion embodying arms extending forwardly from and directly beneath the bridging portion, and forming vertical forwardly opening loops, nose rests, and supporting means for the nose rests having fixed spaced relation connecting with the mounting at the rear edge of the loops and having provision permitting the rocking of the nose rests at points substantially midway between the upper and lower edges of said nose rests.

8. In a spectacle mounting, the combination with lenses and temples connected thereto, a rigid bridging portion, lens attaching devices and pliable portions connecting the bridging portion with the lens attaching devices, of bearing members having fixed spaced relation arranged in rear of the extremities of the bridging portion and nose rests having bearing members coöperating with the first named bearing to permit a rocking of the rests.

9. In a spectacle mounting the combination with lenses and temples connected thereto, a rigid bridging portion, lens attaching devices and pliable portions connecting the bridging portion with the lens attaching devices, of bearing members having fixed spaced relation supported below the extremities of the bridging portion and connected to the mounting between and independently of the pliable portions, and nose rests having bearings rocking on the first named bearings.

10. In a spectacle mounting, the combination with lenses and temples connected thereto, a rigid bridging portion inclined to the plane of the lenses, lens attaching devices, and pliable arms extending forwardly from the extremities of the bridging portion and forming forwardly opening loops, of nose rests having fixed spaced relation and means connecting the latter to the mounting embodying flattened sleeve bearings on one of said parts and flattened bearings on the other of said parts loosely coöperating with the sleeve bearings to permit each of the rests to turn about two axes at right angles to each other.

11. In a spectacle mounting, the combination with lenses and temples connected thereto, a rigid bridging portion inclined to the plane of the lenses, lens attaching devices, and pliable portions between the lens attaching devices and the bridging portion, of flattened sleeve bearings connected to the mounting between the pliable portions, and nose rests arranged in fixed spaced relation having flattened bearings loosely coöperating with the sleeve bearings.

12. The combination with a mounting for lenses and a nose rest, one of said parts being provided with a flattened sleeve bearing opening horizontally and the other having a flattened bearing coöperating with the sleeve bearing, of a pliable forwardly opening loop connected at one end to one of said bearings and at its other end to the nose rest.

13. The combination with a mounting for the lenses having a flattened sleeve bearing opening horizontally, of a nose rest lying on the inner side of the said bearing and having an arm extended from a point between its upper and lower edges outwardly and forwardly and provided with a flattened bearing constructed to rock in the sleeve bearing.

LEO F. ADT.

Witnesses:
EDWARD UNERFLES, 2d,
ISABEL KELLEY.

Copies of this patent may be obtained for five cents each, by addressing the "Commissioner of Patents, Washington, D. C."